United States Patent
Gelencser (10) Patent No.: US 11,694,380 B2
(45) Date of Patent: Jul. 4, 2023

(54) SYSTEM AND METHOD FOR IMMERSIVE TELECOMMUNICATIONS

(71) Applicant: Zoltan Gelencser, Singapore (SG)

(72) Inventor: Zoltan Gelencser, Singapore (SG)

(*) Notice: Subject to any disclaimer, the term of this patent is extended or adjusted under 35 U.S.C. 154(b) by 157 days.

(21) Appl. No.: 17/098,316

(22) Filed: Nov. 13, 2020

(65) Prior Publication Data

US 2022/0157002 A1    May 19, 2022

(51) Int. Cl.
| | | |
|---|---|---|
| G06T 13/00 | (2011.01) | |
| G06T 13/40 | (2011.01) | |
| H04L 67/02 | (2022.01) | |
| G06T 13/80 | (2011.01) | |
| H04L 67/131 | (2022.01) | |

(52) U.S. Cl.
CPC .............. G06T 13/40 (2013.01); G06T 13/80 (2013.01); H04L 67/02 (2013.01); H04L 67/131 (2022.05)

(58) Field of Classification Search
None
See application file for complete search history.

(56) References Cited

U.S. PATENT DOCUMENTS

| | | |
|---|---|---|
| 8,724,906 B2 | 5/2014 | Shotton |
| 9,251,590 B2 | 2/2016 | Sharp |
| 9,344,707 B2 | 5/2016 | Lee |
| 9,424,678 B1 | 8/2016 | Enakiev |
| 9,588,341 B2 | 3/2017 | Bar-Zeev |
| 9,761,032 B2 | 9/2017 | Tong |
| 10,191,559 B2 | 1/2019 | Mandella |
| 10,529,139 B1 | 1/2020 | Greene |
| 2012/0122574 A1* | 5/2012 | Fitzpatrick .............. G06T 13/40 463/31 |
| 2012/0293506 A1 | 11/2012 | Vertucci |
| 2015/0149104 A1* | 5/2015 | Baker .................. G01C 21/165 702/87 |
| 2016/0258779 A1 | 9/2016 | Hol |
| 2017/0084070 A1* | 3/2017 | Chamdani .............. G16H 20/30 |
| 2017/0090554 A1* | 3/2017 | Pececnik ............. G07F 17/3272 |

(Continued)

FOREIGN PATENT DOCUMENTS

| | | |
|---|---|---|
| EP | 2843621 | 3/2015 |
| EP | 2926224 | 10/2015 |

(Continued)

OTHER PUBLICATIONS

"Estimation of Full-Body Poses Using Only Five Inertial Sensors: An Eager or Lazy Learning Approach?" by Frank J. Wouda et al.; in Sensors 2016, 16, 2138; doi:10.3390/s16122138.

(Continued)

Primary Examiner — Martin Mushambo
(74) Attorney, Agent, or Firm — Graeser Associates International Inc; Dvorah Graeser (57) ABSTRACT

A system and method for immersive telecommunications communication by tracking the movement of objects and/or persons with sensors. Movement tracking is then used to animate an avatar that represents the person or object.

(Continued)

Movement may be tracked in real time, which at least reduces latency of communication. The sensors comprise any type of movement sensor which may be attached to a person and/or object for tracking motion, including but not limited to, an IMU (Inertial Measurement Unit), an accelerometer, a gyroscope or other such sensors.

23 Claims, 10 Drawing Sheets

(56) References Cited

U.S. PATENT DOCUMENTS

| | | |
|---|---|---|
| 2018/0225880 A1 | 8/2018 | Yasutake |
| 2018/0239144 A1 | 8/2018 | Woods |
| 2018/0315247 A1 | 11/2018 | Van Andel |
| 2019/0018567 A1 | 1/2019 | Murphy |
| 2019/0122410 A1 | 4/2019 | Chamdani |
| 2019/0188895 A1 | 6/2019 | Miller, IV |
| 2019/0310757 A1 | 10/2019 | Lee |
| 2019/0362529 A1 | 11/2019 | Wedig |
| 2020/0002017 A1 | 1/2020 | Shi |

FOREIGN PATENT DOCUMENTS

| | | |
|---|---|---|
| KR | 101667607 B1 | 10/2016 |
| WO | 2016045005 A1 | 3/2016 |
| WO | 2018146546 | 8/2018 |

OTHER PUBLICATIONS

"Full-Body Locomotion Reconstruction of Virtual Characters Using a Single Inertial Measurement Unit" by Christos Mousas; Sensors 2017, 17, 2589; doi: 10.3390/s17112589.

"Inertial Sensor-Based Touch and Shake Metaphor for Expressive Control of 3D Virtual Avatars" by Shashidhar Patil el al; Sensors 2015, 15, 14435-14457; doi:10.3390/s150614435.

"Real-time Simultaneous Pose and Shape Estimation for Articulated Objects Using a Single Depth Camera", by Mao Ye et al.; in IEEE Transactions on Pattern Analysis and Machine Intelligence, vol. 38, No. 8, pp. 1517-1532, Aug. 1, 2016, doi: 10.1109/TPAMI.2016.2557783.

"Xsens MVN: Consistent Tracking of Human Motion Using Inertial Sensing" by Martin Schepers et al.; Technical Report Mar. 2018, published by Xsens Technologies B.V., P.O. Box 559, 7500AN Enschede, the Netherlands,; DOI: 10.13140/RG.2.2.22099.07205.

Office Action (Notice of Allowance and Fees Due (PTOL-85)) dated Sep. 16, 2022 for U.S. Appl. No. 17/098,316 (pp. 1-10).

* cited by examiner

SYSTEM AND METHOD FOR IMMERSIVE TELECOMMUNICATIONS

FIELD OF THE INVENTION

The present invention is of a system and method for immersive telecommunications as described herein, and in particular, for such a system and method for tracking movement of objects and/or persons with sensors for communication.

BACKGROUND OF THE INVENTION

Certain systems have been proposed for monitoring the movements of users, for example with cameras, including depth and/or image based cameras, and optionally with other sensors added.

For example, US20190122410A1 describes a system for capturing and analyzing motions to render a human avatar animation. The movements of the user are tracked and then compared to a desired standard, for example for movements involved in sports.

US20190362529A1 describes skeletal systems for animating virtual avatars. The application relies on depth sensors and/or image based cameras to determine how the user is moving.

BRIEF SUMMARY OF THE INVENTION

The background art does not teach or describe a system or method for monitoring the movements of users and/or objects in real time, to support communication or transmission of such movement or movements, without requiring depth sensors and/or image based cameras to track such movements.

The present invention overcomes the drawbacks of the background art by providing a system and method for immersive telecommunications by tracking the movement of objects and/or persons with sensors. As used herein, the term "immersive telecommunications" includes any one or more of virtual reality, augmented reality, mixed reality, extended reality, immersive verbal and nonverbal telecommunication technologies as well as verbal and nonverbal telecommunication in the reality-virtuality continuum.

Movement tracking is then used to animate an avatar that represents the person or object.

Movement may be tracked in real time, which reduces latency of communication, and increases the speed and efficiency of communication.

The sensors comprise any type of movement sensor which may be attached to a person and/or object for tracking motion, including but not limited to, an IMU (Inertial Measurement Unit), an accelerometer, a gyroscope or other such sensors.

The system as described herein does not require any type of depth camera or image-based camera.

Furthermore, the system as described herein does not require any type of optical sensor, structured light or other optical devices. Additionally, the system as described herein does not require an additional or fixed external reference point, thereby supporting communication mobility.

This provides a significant advantage for true mobility in providing avatar-based communication, as these optical systems and devices have many drawbacks for both operational functions and also portability.

By contrast, according to at least some embodiments, the system of the present invention only requires the user to wear the sensors and to communicate with a mobile phone or AR/VR headset, smart contact lens or glasses, or other communication modality. As used herein, the term "communicate" refers to transmitting at least movement/motion information, and optionally audio information, such as voice information for example.

According to at least some embodiments, there is provided a system and method for controlling animation of an avatar through controlled movements of the user, as detected by a plurality of motion sensors placed on the body of the user directly, including without limitation on apparel and/or an object being worn by the user.

Optionally the avatar is not adjusted on the fly or in real time according to the body of the user.

The plurality of motion sensors are preferably placed on the limbs of the user, and optionally also on the head of the user.

The sensors may be attached to clothing, headgear and the like. Controlling the avatar may be used for mobile communication, for example as augmented reality (AR).

For such a communication system, preferably the avatar features a three-dimensional avatar, as selected, uploaded and/or created by the user.

When the user wishes to communicate by using the avatar, the user places multiple sensors at different points on their body, such as for example head, upper and lower arms, hands, legs, feet and so forth. These sensors measure rotation and may for example be IMUs. The IMU measures linear acceleration and angular velocity, and may optionally be used to measure compass directions.

Preferably the IMU creates a clean real-time digital stream of quaternions, through sensor fusion.

The user may indicate which IMU sensor is attached to which body part during a calibration phase with the server. The calibration phase may also include an association or setup phase, during which this sensor location information is provided. For future sessions, if the sensor location information remains the same or at least appears to be correct to the system, then this initial association or setup phase may not be performed during calibration.

Preferably, the animation is controlled through an animation engine, as operated by the server.

As the user moves and speaks, the animation engine causes the avatar to move in a corresponding manner, by moving different parts of the rigging associated with the avatar.

The sensors sense rotation of the various body parts of the user. Each rotation is then translated by the animation engine to a movement of a part of the avatar.

The system may be used for AR (augmented reality) based communication, as well as for other types of virtual communication.

Such communication may be mobile; for example, the user can communicate through their mobile telephone while wearing the sensors.

The protocol employed is preferably an efficient binary protocol, which supports real time communication. The efficient binary protocol supports communication from a motion sensor to a server. Such communication may be direct from the sensor to the server, or indirect, from the sensor to an intermediary device, and then to the server. The intermediary device may for example comprise a user computational device or an object computational device, which may depend on where the motion sensors are located. The binary protocol may also be used for audio data, such as voice data for example. The binary protocol is a communication protocol supporting transmission of data. Each such type of data may be stateful or non-stateful. Without wishing to be limited in any way, the binary protocol may be considered as a type of data transmission protocol in a similar category to TCP/IP or other communication protocol. Optionally device status information is provided through a stateful protocol, such as TCP/IP and/or HTTP.

The support of real-time movement animation provides such advantages as nonverbal communication, and body language and more nuanced communication, without wishing to be limited by a closed list.

Selecting an avatar and then causing the avatar to move also overcomes disadvantages involved in tracking a user's body as a three-dimensional volume that is moving in space.

Algorithms which attempt to realistically provide such tracking require depth cameras and optical systems, as noted above. They are also computationally very resource-intensive, which is problematic for mobile communication.

In addition to avatars of users, avatars may also be provided for physical objects, which could then have sensors attached to them at various locations to capture movement.

Such avatars could be useful for training a user through remote learning and any suitable immersive telecommunications application or modality, for example for operation and repair of physical equipment.

According to at least some embodiments of the present invention, there is provided a calibration application, for calibrating the placement of the sensors on the various body parts of the user, such as the limbs of the user. The calibration application supports mobile communication or other uses as described herein, by calibrating the location of sensors so that movement of the avatar corresponds to the movement of the user.

According to at least some embodiments, the animation engine and input sensor data may be used for assisting gameplay through a game engine, as the user plays the game by moving with the attached sensors; the user's movements may then be correlated with game play. The game engine may also be correlated with the previously described motion server, so that sensor movement is correlated with the body parts of the avatar.

Implementation of the method and system of the present invention involves performing or completing certain selected tasks or steps manually, automatically, or a combination thereof.

Moreover, according to actual instrumentation and equipment of preferred embodiments of the method and system of the present invention, several selected steps could be implemented by hardware or by software on any operating system of any firmware or a combination thereof.

For example, as hardware, selected steps of the invention could be implemented as a chip or a circuit.

As software, selected steps of the invention could be implemented as a plurality of software instructions being executed by a computer using any suitable operating system.

In any case, selected steps of the method and system of the invention could be described as being performed by a data processor, such as a computing platform for executing a plurality of instructions.

Unless otherwise defined, all technical and scientific terms used herein have the same meaning as commonly understood by one of ordinary skill in the art to which this invention belongs. The materials, methods, and examples provided herein are illustrative only and not intended to be limiting.

An algorithm as described herein may refer to any series of functions, steps, one or more methods or one or more processes, for example for performing data analysis.

Implementation of the apparatuses, devices, methods and systems of the present disclosure involve performing or completing certain selected tasks or steps manually, automatically, or a combination thereof.

Specifically, several selected steps can be implemented by hardware or by software on an operating system, of a firmware, and/or a combination thereof.

For example, as hardware, selected steps of at least some embodiments of the disclosure can be implemented as a chip or circuit (e.g., ASIC).

As software, selected steps of at least some embodiments of the disclosure can be implemented as a number of software instructions being executed by a computer (e.g., a processor of the computer) using an operating system.

In any case, selected steps of methods of at least some embodiments of the disclosure can be described as being performed by a processor, such as a computing platform for executing a plurality of instructions.

Software (e.g., an application, computer instructions) which is configured to perform (or cause to be performed) certain functionality may also be referred to as a "module" for performing that functionality, and also may be referred to a "processor" for performing such functionality.

Thus, processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions—which can be a set of instructions, an application, software—which are operable on a computational device (e.g., a processor) to cause the computational device to conduct and/or achieve one or more specific functionality. Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device.

Two or more of such devices in communication with each other may be a "computer network."

BRIEF DESCRIPTION OF THE DRAWINGS

The invention is herein described, by way of example only, with reference to the accompanying drawings.

With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention.

In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF AT LEAST SOME EMBODIMENTS

Figure 1A:
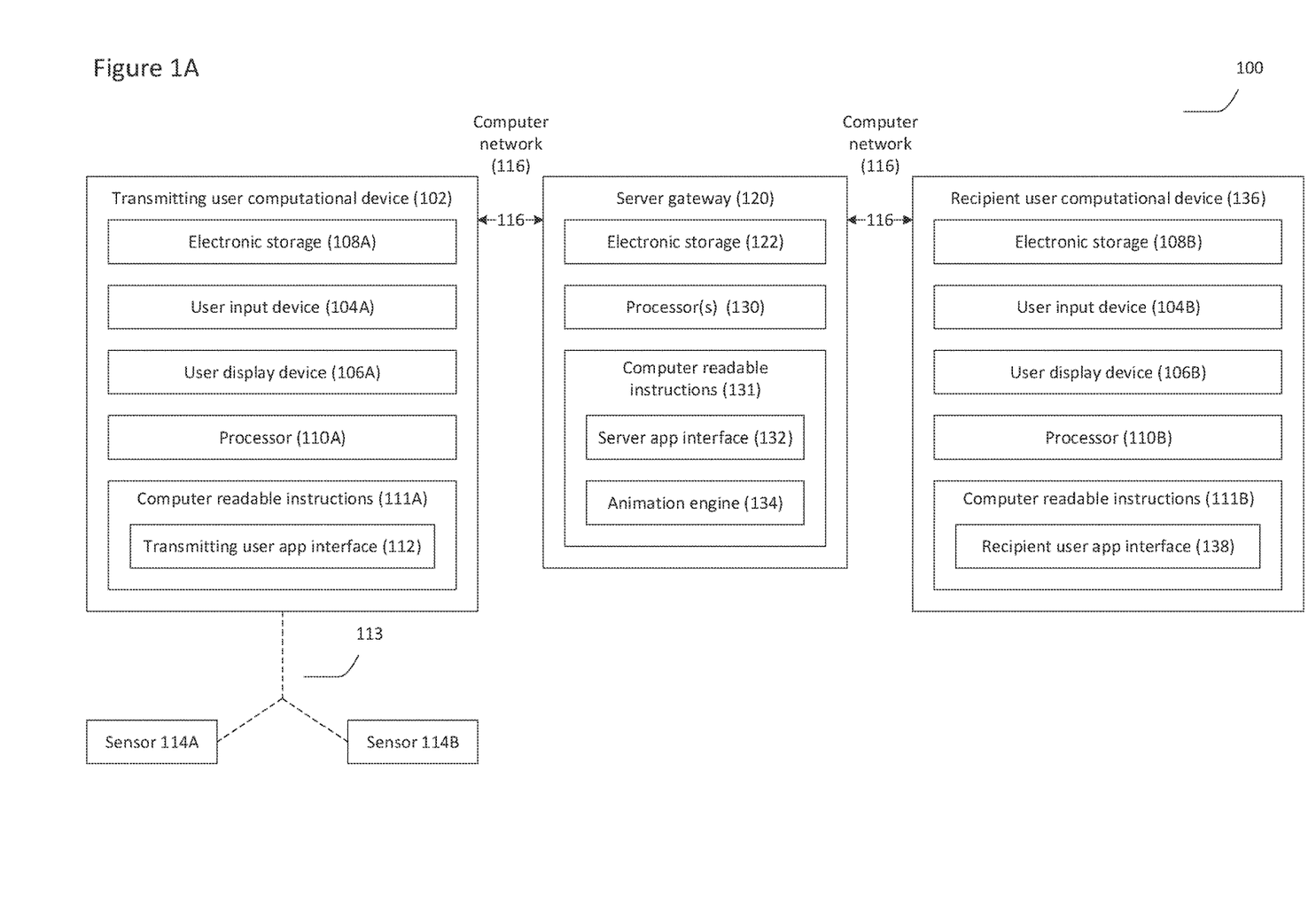
FIGS. 1A and 1B show a non-limiting exemplary system for providing communication for immersive telecommunications.

Turning now to the drawings, there is shown, in FIG. 1A, a non-limiting exemplary system for providing communication for immersive telecommunications, for example according to any modality as described above.

As shown in the system 100 there is provided a transmitting user computational device 102, which is in communication with a server gateway 120 through computer network 116. Server gateway 120 features an animation engine 134.

Animation engine 134 renders information provided from a plurality of sensors shown as 114A and 114B, and then transmits this rendered information as animation to a recipient user computational device 136 for display through a recipient interface 138. Components with the same reference number as for transmitting user computational device 102 but with "B" at the end, have the same or similar function.

Recipient user computational device 136 may comprise a laptop or any type of computer, a mobile phone or any type of wireless communicator with a display, or an AR/VR headset or glasses, or any other computational device or computer as described.

As described herein, for a recipient to receive communication in the form of an avatar, animated by sensor based information as described herein, such a recipient would interact with a display provided through a device including, but not limited to, a laptop or any type of computer, a mobile phone or any type of wireless communicator with a display, or an AR/VR headset or glasses.

Two way communication is possible but is not shown here.

Recipient interface 138 may for example comprise any type of suitable software which is able to read the information about the avatar and the animation (movement) of the avatar.

Optionally the information about the avatar comprises the output from sensors 114A and 114B.

Also optionally the sensor output is at least partially processed by animation engine 134, for example to provide streaming data to recipient interface 138.

Recipient interface 138 then optionally renders the avatar with animation, and optionally with audio such as voice for an audible display.

Preferably recipient interface 138 also renders texture with the animation and also optionally audible data for a combined display with animation of the avatar.

Alternatively data is provided as streaming data from animation engine 134, with reduced or minimal processing for display by recipient interface 138.

All or partial processing may also occur at transmitting user computational device 102.

Sensors 114A and 114B may comprise any type of movement sensor which may be attached to a person and/or object for tracking motion, including but not limited to, an IMU (Inertial Measurement Unit), an accelerometer, a gyroscope or other such sensors.

Preferably sensors 114A and 114B communicate with transmitting user computational device 102 to provide the sensor data through a connection 113, which is preferably wireless.

Optionally transmitting user computational device 102 does not perform any calculations or processing of the data, but instead only transmits the data onward to server gateway 120.

Also optionally sensors 114A and 114B may communicate directly to server gateway 120, for example through a wireless connection (not shown).

Various types of wireless connections may be used throughout system 100, for example WiFi, cellular connectivity protocols, Bluetooth, radiofrequency data and the like.

Sensor data, whether from sensors 114A and 114B to transmitting user computational device 102, or from transmitting user computational device 102 to server gateway 120, is preferably transmitted according to a binary protocol that compresses the size of the data, thereby requiring less communication bandwidth for transmission.

User interface 112 enables the user controlling transmitting user computational device 102 to, for example, perform calibration and other functions with the sensors 114A and 114B, and also to receive communication through user interface 112.

For example, user interface 112 permits the user to communicate verbally or with text to recipient user computational device 136.

Optionally user interface 112 would also display corresponding animation from another transmitting user computational device, as animated by animation engine 134, but this is not shown.

For such a communication system, preferably the avatar that is animated by animation engine 134 features a three-dimensional avatar, as selected, uploaded and/or created by the user.

When the user wishes to communicate by using the avatar, the user places multiple sensors 114 at different points on their body, such as for example head, upper and lower arms, hands, legs, feet, torso and so forth.

These sensors 114 measure rotation and may for example be IMUs as described above.

The IMU measures linear acceleration and angular velocity.

Preferably the IMU creates a clean real-time digital stream of quaternions, through sensor fusion.

Such data is then provided to animation engine 134, which converts the measured rotation to movement of a particular part of the avatar.

Optionally smoothing algorithms may be used, for example to smooth motion over a set of joints and/or to simulate movement of musculature or other underlying aspects of the avatar.

Transmitting user computational device 102 also comprises a processor 110A and a memory 111A.

Functions of processor 110A preferably relate to those performed by any suitable computational processor, which generally refers to a device or combination of devices having circuitry used for implementing the communication and/or logic functions of a particular system.

For example, a processor may include a digital signal processor device, a microprocessor device, and various analog-to-digital converters, digital-to-analog converters, and other support circuits and/or combinations of the foregoing.

Control and signal processing functions of the system are allocated between these processing devices according to their respective capabilities.

The processor may further include functionality to operate one or more software programs based on computer-executable program code thereof, which may be stored in a memory, such as a memory 111A in this non-limiting example.

As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Also optionally, memory 111A is configured for storing a defined native instruction set of codes.

Processor 110A is configured to perform a defined set of basic operations in response to receiving a corresponding basic instruction selected from the defined native instruction set of codes stored in memory 111A.

For example and without limitation, memory 111A may store a first set of machine codes selected from the native instruction set for receiving information from the user through user app interface 112 regarding the recipient user at recipient user computational device 136; a second set of machine codes selected from the native instruction set for receiving data from sensors 114A and 114B, optionally including performing preprocessing; and a third set of machine codes selected from the native instruction set for transmitting such information and data to server gateway 120 for rendering by animation engine 134.

Similarly, server gateway 120 preferably comprises a processor 130 and a memory 131 with related or at least similar functions, including without limitation functions of server gateway 120 as described herein.

For example and without limitation, memory 131 may store a first set of machine codes selected from the native instruction set for receiving the sensor data and contact information from user computational device 102, a second set of machine codes selected from the native instruction set for executing functions of animation engine 134; and a third set of machine codes selected from the native instruction set for transmitting the rendered animation to recipient user computational device 136.

Such transmission of animation and contacts may be provided through a server app interface 132, which may also communicate with user app interface 112 and recipient interface 138.

Transmitting user computational device 102 also preferably includes user input device 104A and user display device 106A. The user input device 104A may optionally be any type of suitable input device including but not limited to a keyboard, microphone, mouse, a keyboard/mouse combination or other pointing device and the like. User display device 106A is able to display information to the user for example from user app interface 112. Electronic storage may be provided through electronic storage 108A, for example for additional data storage and the like.

Server gateway 120 also preferably comprises an electronic storage 122, for example for additional data storage and the like.

Figure 1B:
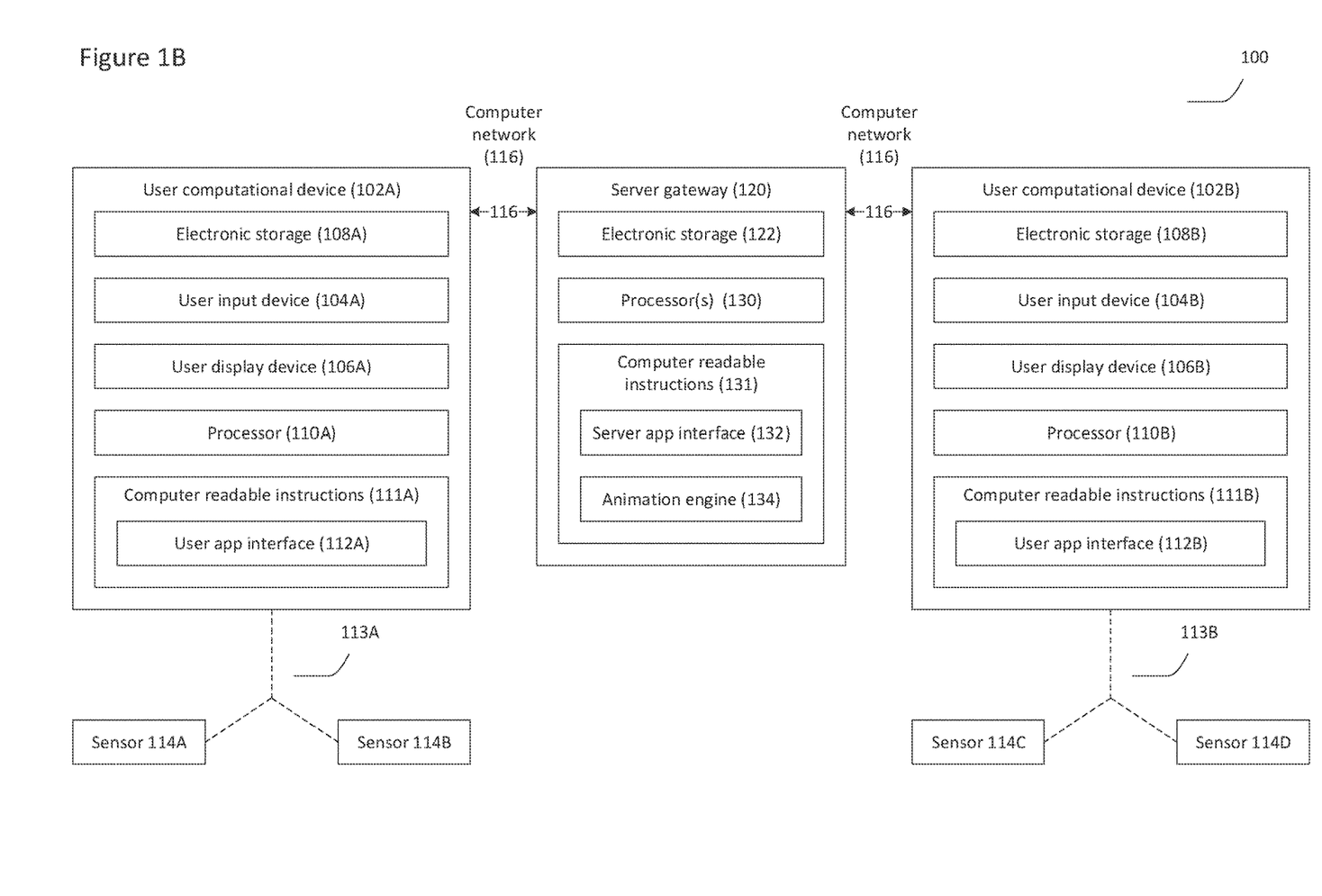

FIG. 1B shows an exemplary two-way communication system. In this non-limiting example, items with the same reference number have the same or similar function. In this case there are two users who are both transmitters and receivers, shown as user computational device 102A and user computational device 102B.

User computational device 102B also has sensors 114C, and 114D for showing movements of that particular user.

The user movement information from all sensors 114A-114D is transmitted to animation engine 134 for rendering, followed by transmission of the rendered animation to the receiving user computational device.

For example user computational device 102A would send sensor information regarding the movements of the user from sensors 114A and 114B, which would then be transmitted to server gateway 120 for rendering to animation by animation engine 134.

The animation would then be transmitted to user computational device 102B for display by the user interface 112B.

Correspondingly, information relating to the movements of the user controlling user computational device 102B would be obtained through data obtained from sensors 114C and 114D, which would again transmitted to server gateway 120 as previously described. The rendered animation from animation engine 134 would be transmitted to user computational device 102A for display by user app interface 112A.

Figure 2A:
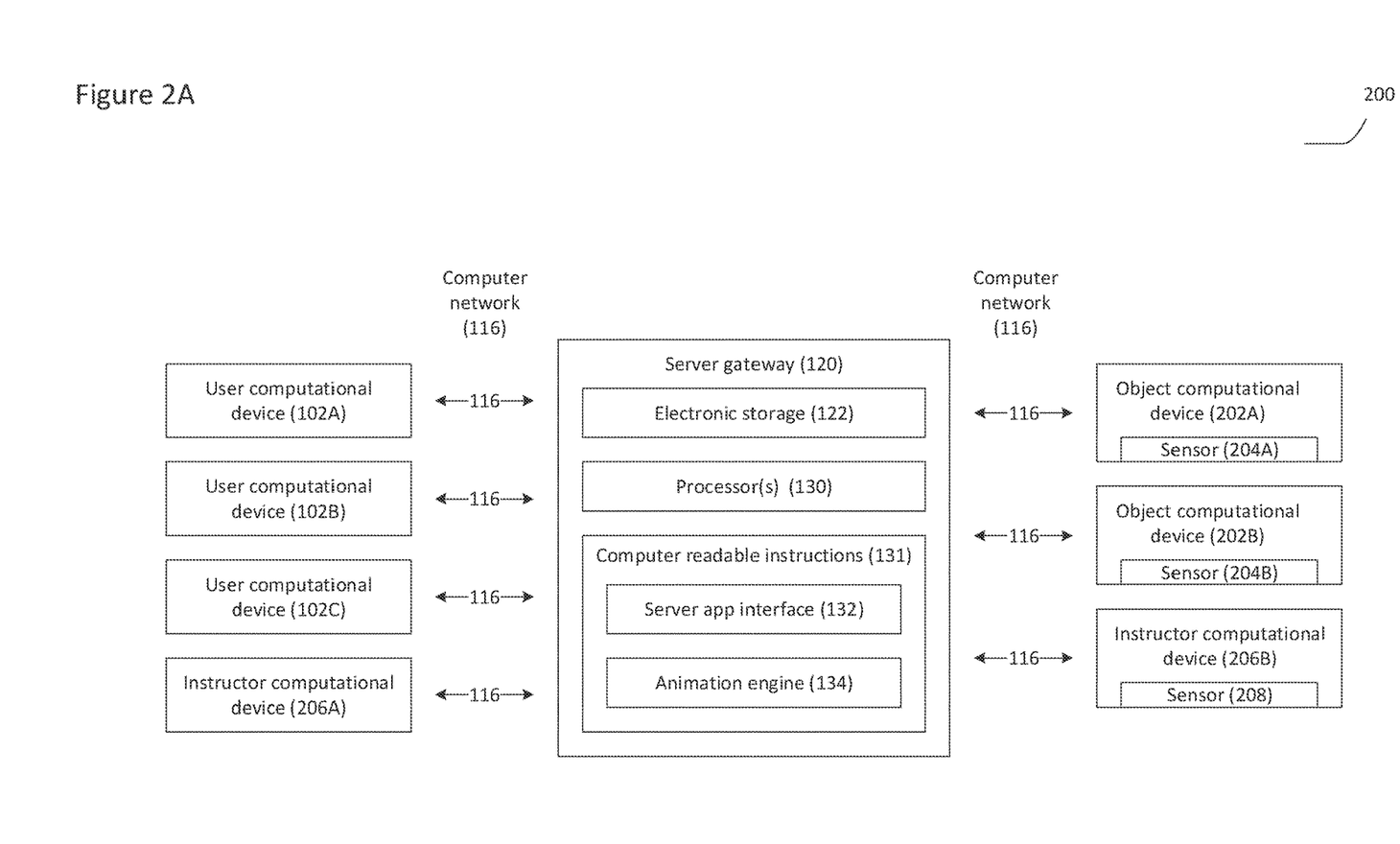
FIGS. 2A-2C show a non-limiting exemplary system for multiple user communication between a plurality of different users and/or objects, in various non-limiting configurations.
Figure 2B:
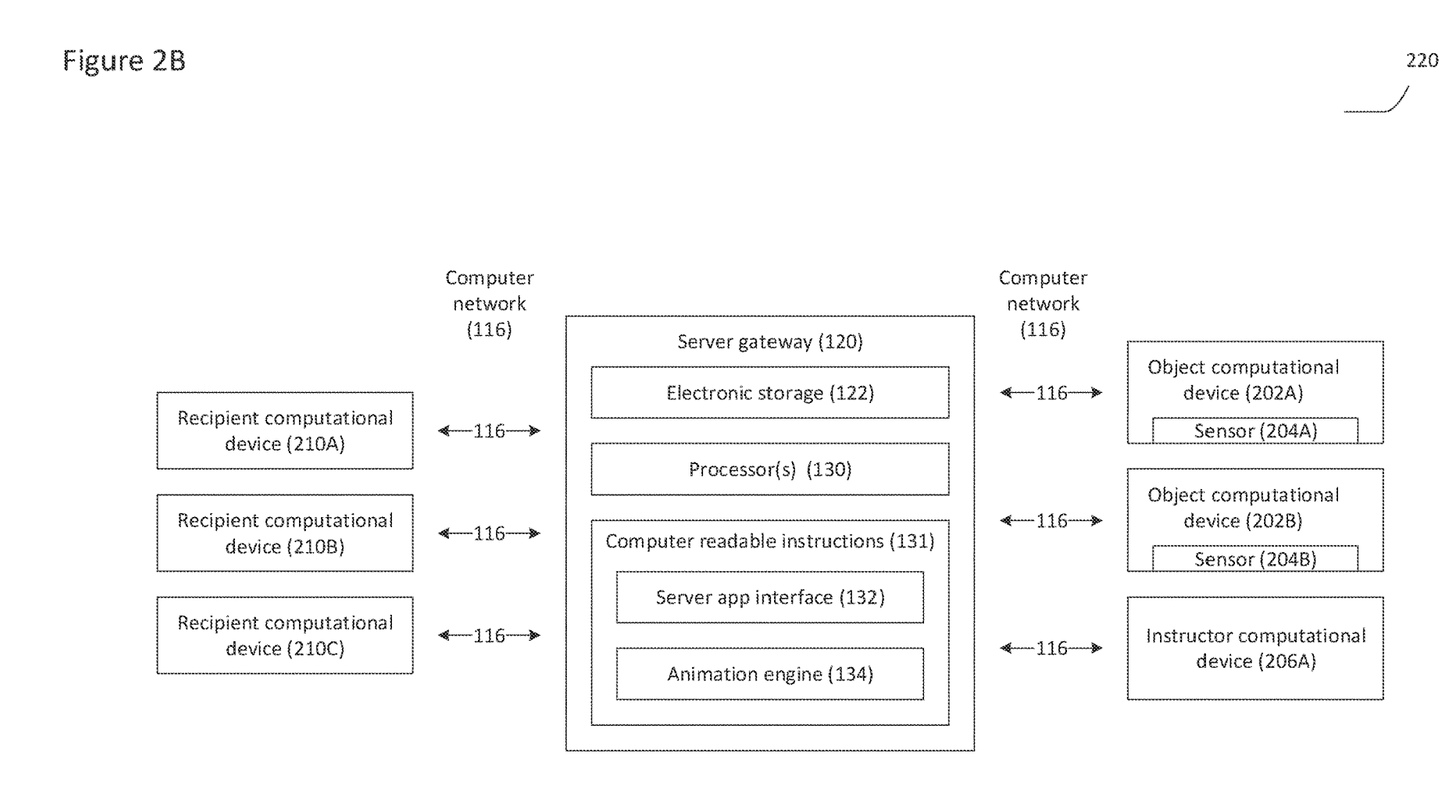
Figure 2C:
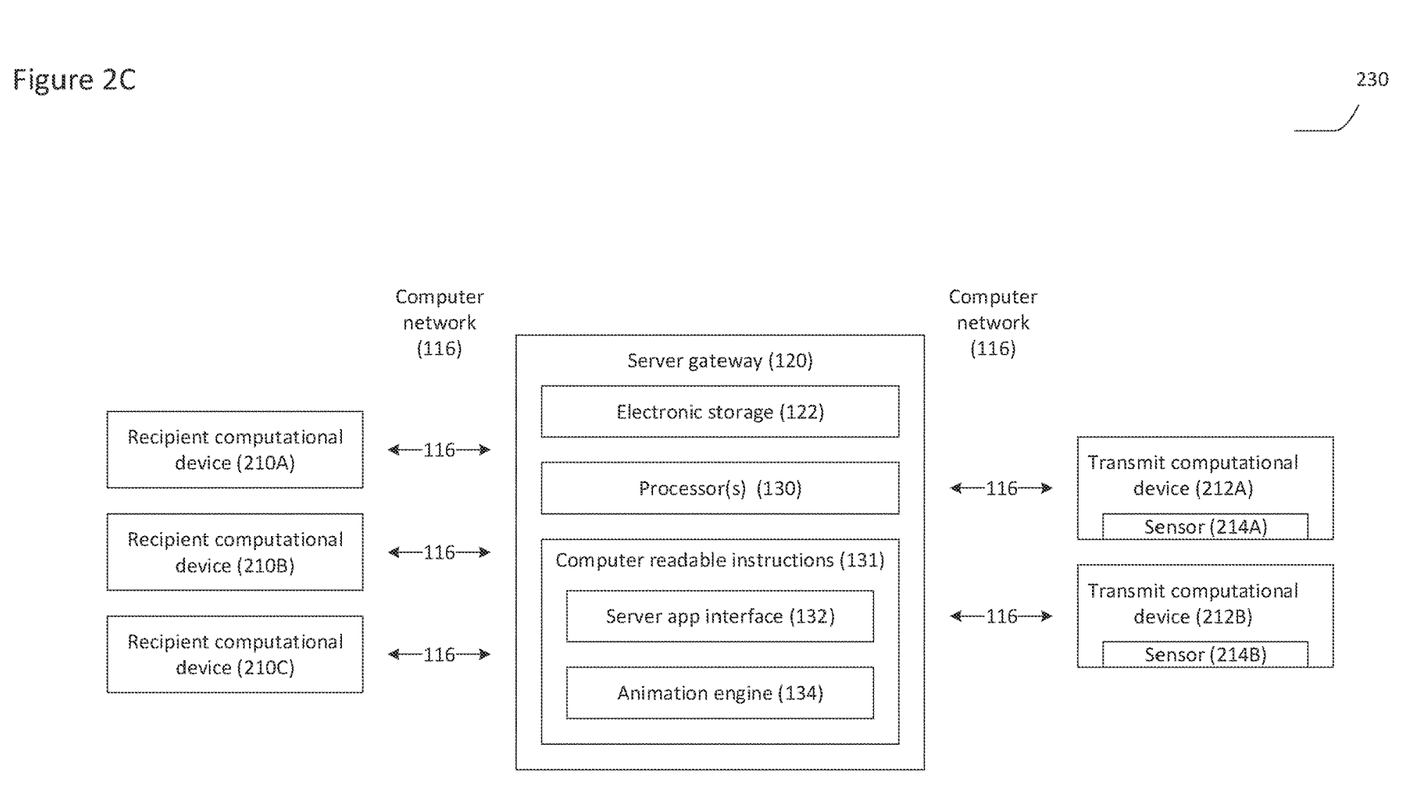

FIGS. 2A-2C show non-limiting exemplary systems for communication between a plurality of different users and/or objects, in various non-limiting configurations. Items with the same reference numbers as in FIGS. 1A and 1B, or in any of FIGS. 2A-2C, have the same or similar function.

FIG. 2A shows a non-limiting exemplary system for multiple user communication. A system 200 features a plurality of user computational devices 102A-102C, through which is displayed information obtained with regard to the movement of an object relating to a plurality of sensors.

In this non-limiting example, it is assumed that the system is for learning or other pedagogical or demonstration purposes, such that an instructor computational device 206 may be used for example to provide verbal information or textual information regarding the movement of objects.

Two such instructional computational devices 206A and 206B are shown for the purposes of illustration only.

These objects for example may include but are not limited to objects associated with object computational devices 202A-202B, and the corresponding sensors 204A-204B.

Object computational devices 202A-202B may also feature embedded processors and other simpler computational functions for the object, and may also be incorporated to sensor devices having enough computational power for initial sensor data processing and transmission.

Optionally, sensors 204A-204B are not part of object computational devices 202A-202B and may instead transmit to these object computational devices 202A-202B.

For example, for a physical object that is moving such sensors 204A-204B, or more, could transmit information about moving of the physical object or parts thereof. Measurements by sensors 204A-204B may relate to the actions of a plurality of actual physical assets (physical twins) as digital twins. The term "digital twin" as used herein may refer to a digital replica of one or more of potential and actual physical assets (physical twin), processes, people, places, systems and devices that can be used for various purposes.

This will be transmitted to animation engine 134 and then sent to user computational devices 102A-102C for example, for demonstration or pedagogical purposes.

Optionally, instructor computational devices 206A and 206B could be used, for example to give instructions control the movement of the object and so forth.

In this non-limiting example, instructor computational device 206B has an additional sensor 208, while instructor computational device 206A does not feature such an additional sensor.

Additional sensor 208 may be used by the instructor operating instructor computational device 206B, for example to track the movements of this instructor, for example for demonstration purposes.

Optionally such an additional sensor 208 is not present (not shown).

Also optionally only one instructor computational device 206 is present (not shown).

Optionally and preferably, user computational devices 102A-102C are able to both transmit and receive animations, such that the movements of the users of user computational devices 102A-102C may be shown to other user computational device(s) 102 and/or to any instructor computational device 206.

To be able to both transmit and receive, the users of user computational devices 102 would wear sensors as previously described.

FIG. 2B shows a similar system to that of FIG. 2A, in a system 220. In this system, user computational devices are shown as recipient computational devices 210A-210C, for receiving animation information and optionally sound.

Combinations between FIGS. 2A and 2B are also possible. FIG. 2B also shows the operation of physical objects, the movements of which may be measured to create digital twins.

FIG. 2C shows recipient computational devices for viewing animation information and optionally sound, determined according to sensor data obtained from transmitting computational devices.

These transmitting computational devices may feature sensors worn by a plurality of different humans (or optionally moving plurality of physical twins in combination with, or as a replacement for, human performers).

Such transmission may be used for example for a musical performance, including without limitation a concert, opera, DJ, dance or other type of performance, and for any type of music; a ballet or other dance performance; theatre or other live human based performance, optionally with a digital component; first person shooters or other various types of games, including with regard to digital twins; sports and the like.

The viewer watching through a recipient computational device may optionally be able to select any point of view for these different activities.

As shown in a system 230, sensor data is captured from a plurality of sensors 214A and 214B, worn by a plurality of humans and/or moving objects (not shown) and in communication with a plurality of transmitting computational devices 212A and 212B.

The sensor data is fed to animation engine 134, for example as described herein, and is then provided as animations for display by recipient computational devices 210A-210C, as previously described.

Figure 3:
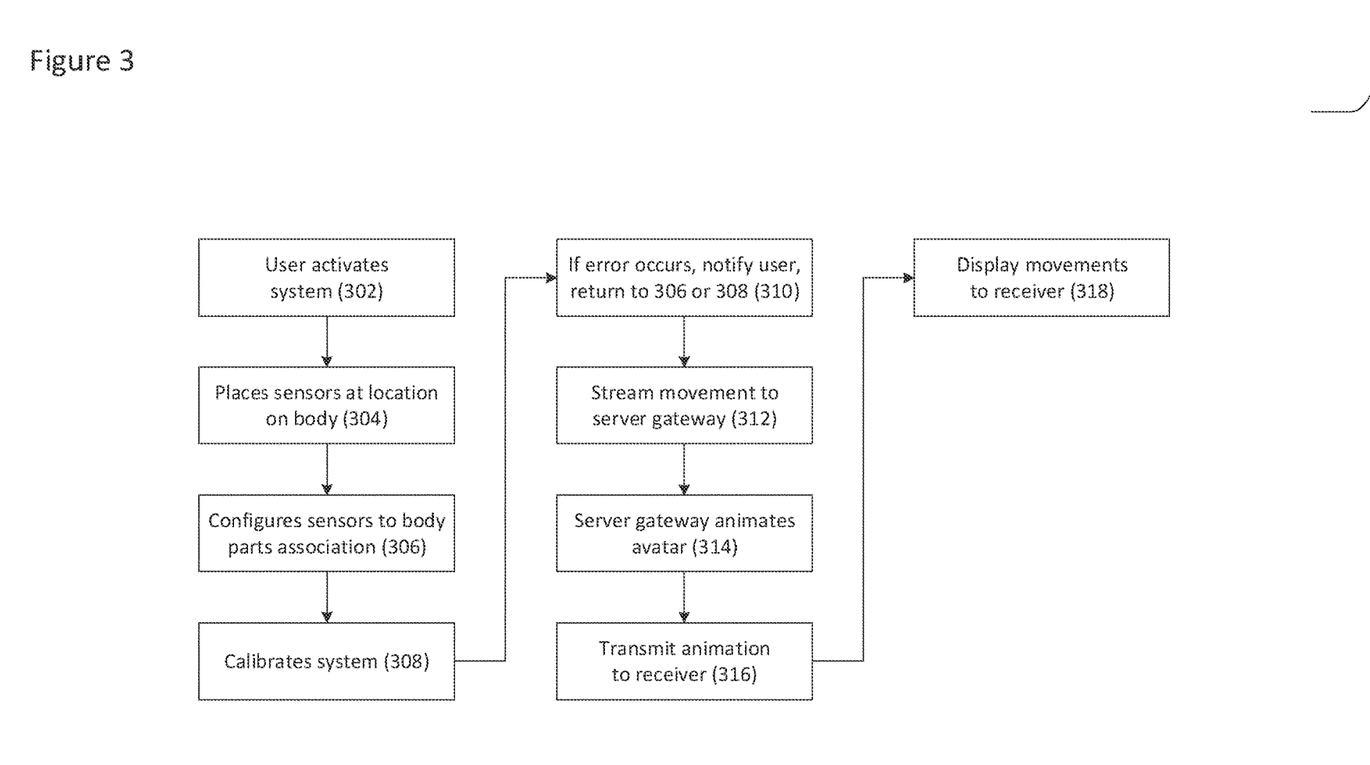
FIG. 3 shows a non-limiting exemplary method for operation of the system as described herein.

FIG. 3 shows a non-limiting exemplary method for operation of the system as described herein. As shown in a method 300, the user activates the system in 302 and then places the sensors at locations on the body at 304. For example, sensors can be placed on each limb, for example at each wrist, optionally at the head, and optionally at the legs or feet, optionally at the torso, and also optionally at other locations on the body.

Next, the user inputs the sensor locations to the system at 306. Optionally this process is performed once. If the user maintains the sensor locations at the same or similar locations, then this information may be saved and reused. This may be done automatically but is preferably indicated manually by the user.

The system then calibrates the locations of the sensors, according to movements of the user at 308. For example, the user may be asked to stand in a certain pose, or in one or more poses for calibration. The location of the sensors may then be analyzed so that if the user is in the requested pose, the relative locations of the sensors correspond to an expected of the user specifically or of the human body generally.

If an error in calibration occurs, the system notifies the user at 310 and the process returns to 306 or 308, depending on the nature of the error.

If however, no errors detected then the process continues with transmitting sensor data on actual movements of the user for animation to the server at 312, for example, using the previously described binary protocol for upstream data transmission. Such transmission comprises streaming at least movement data to the server. If available, audio data, such as voice data, is preferably also streamed. The binary protocol is a communication protocol supporting transmission of data. Each such type of data may be stateful or non-stateful. Without wishing to be limited in any way, the binary protocol may be considered as a type of data transmission protocol in a similar category to TCP/IP or other communication protocol. Optionally device status information is provided through a stateful protocol, such as TCP/IP and/or HTTP.

Optionally audio data is also provided, such as for example the voice of the user.

These movements are then used to determine the animation of the avatar at 314, such that the movements of the user, as determined by the sensors, determine the movements of the avatar.

Animation instructions are then transmitted to the receiver regarding the movements of the avatar, optionally matched with the audio data, at 316, in a downstream binary format. If available, audio, such as voice, data is preferably also transmitted.

Movements of the avatar as shown to the receiver for display at 318, optionally with the audio data, such as the voice of the user for example. If both audio and movement data are available, then preferably they are played at the receiver, through the receiver's display, in a synchronized manner. For example, if the audio data was voice data and the movements of the avatar corresponded to the movements of the transmitting user that also provided the voice data, then the receiver would view the movements of the avatar synchronized with the voice data as performed by the transmitting user. Facial movements may be generally synchronized with voice data through the avatar, or may alternatively be precisely generated and synchronized, for example through natural language processing analysis of the words being spoken.

Figure 4:
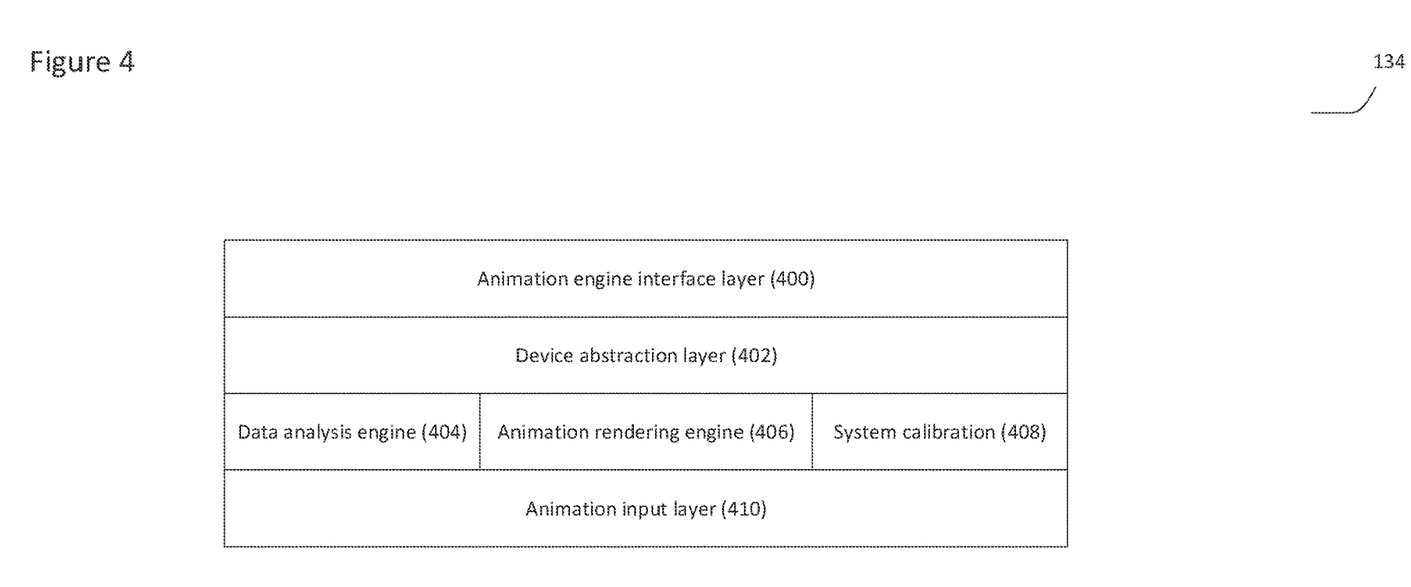
FIG. 4 shows a non-limiting exemplary version of the animation engine 134.

FIG. 4 shows a non-limiting exemplary version of the animation engine 134.

The animation engine 134 was described also with regard to FIGS. 1A and 1B.

With regard to FIG. 4, animation engine 134 includes an animation engine interface layer 400 for example for receiving sensor inputs from the various sensors as previously described.

These inputs are preferably provided to a device abstraction layer 402, to abstract inputs from different sensors.

For example, the system may incorporate different sensor types with different capabilities, or that have different manufacturers or standards with different communication protocols.

Device abstraction layer 402 is able to abstract these various sensor requirements in order to reduce the necessity for having separate drivers or other types of input interfaces for different types of sensors.

Next, the sensor measurements are preferably passed to a data analysis engine 404, for analyzing in order to determine the movements of the user and providing the information to animation rendering engine 406 in a manner which could be determined more easily.

So for example, for animating an avatar, animation rendering engine 406 may abstract this information and may link it to different parts of the avatar for rendering correct motion.

A system calibration 408 is used to calibrate the sensors with regard to animation rendering engine 406 in order to determine how the sensors are placed, and how the sensor input is expected to be used with regard to avatar animation.

All of this information is preferably fed to an animation input layer 410. This may be used for example, to communicate with different types of avatar animation software which are used to actually send the commands to the recipient interface for displaying the animated avatar.

Optionally animation output layer 410 communicates with other components that are present on the server.

It is also possible that one or more of these components are located on the receiver computational device so that the receiver is able to see the animated avatar as displayed.

Figure 5A:
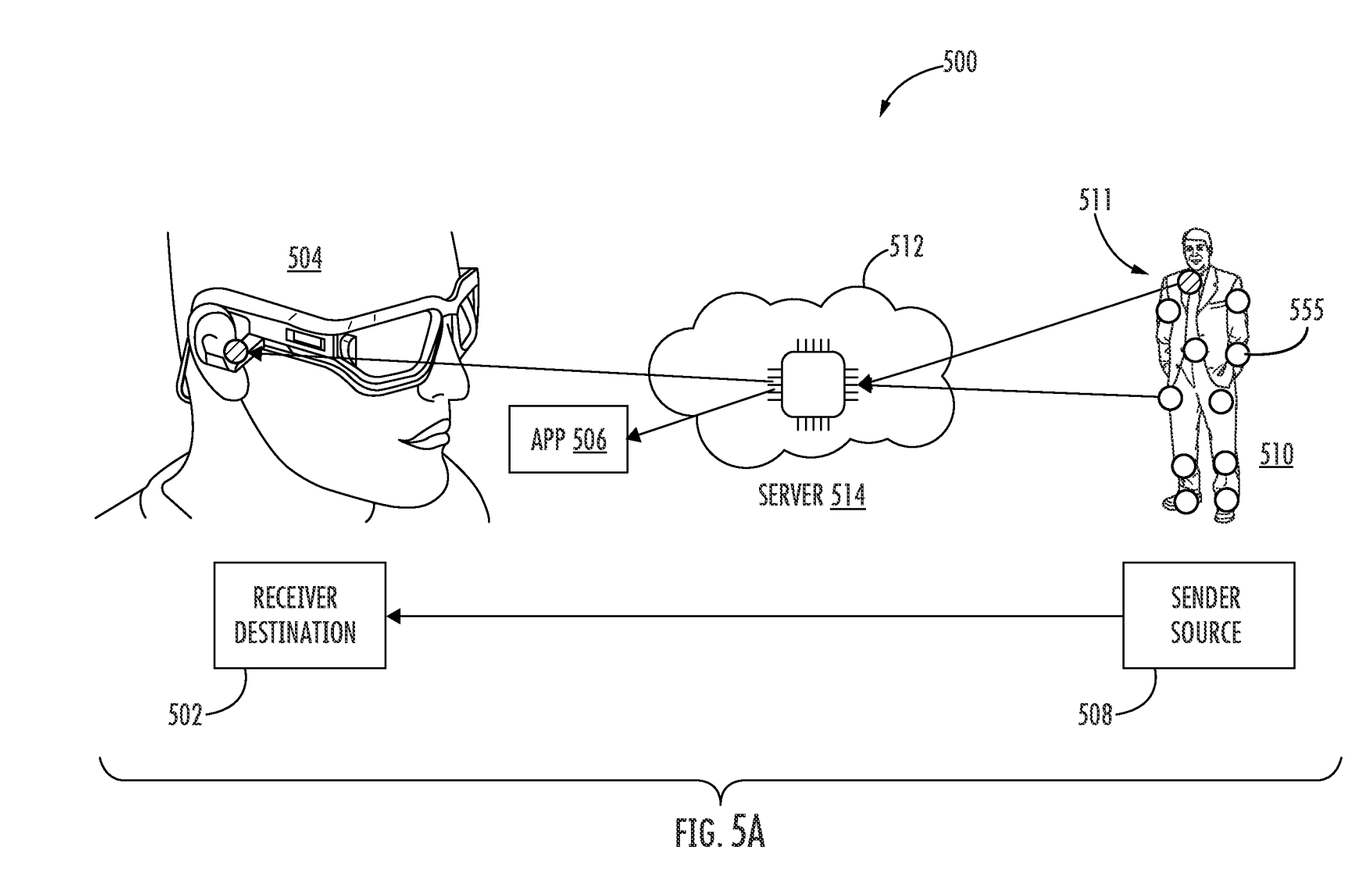
FIGS. 5A and 5B show non-limiting exemplary systems for enabling a user to see an avatar as animated by sensors placed on another user or on an object.

FIG. 5A shows a non-limiting exemplary system for enabling a user to see an avatar as animated by sensors placed on another user in a system 500.

A receiving user is shown as a receiver destination 502. As a non-limiting example, receiver destination 502 comprises VR/AR glasses 504 in order to be able to see the display of the avatar animation. The animation itself is preferably provided through an app 506. Other types of display are also possible of course, including without limitation any suitable immersive telecommunications display as described herein.

The information for animating the avatar is received from a transmitter 508, which features a plurality of sensors attached to the body of a user 510, shown as sensors 555. Sensors 555 are indicated as a plurality of circles attached to various points on the body of the user 510.

The user who is transmitting may also optionally have a voice device 511 for transmitting their voice, in addition to their movements, as part of the real time communication.

The movements, optionally with the voice, are then transmitted to a cloud based setup 512 which may for example, include a server 514 or some other type of engine for creating the animation. The animation, and optionally and preferably the voice data, is transmitted to receiver destination 502 for display as described above. For example, the animation and optional voice data may be used for better non-verbal communication. Without wishing to be limited by a closed list, the animation preferably provides true 3D visualization of the animated avatar, in real time (that is, with significantly reduced latency, which is preferably less than a second and more preferably no more than 1 ms).

Figure 5B:
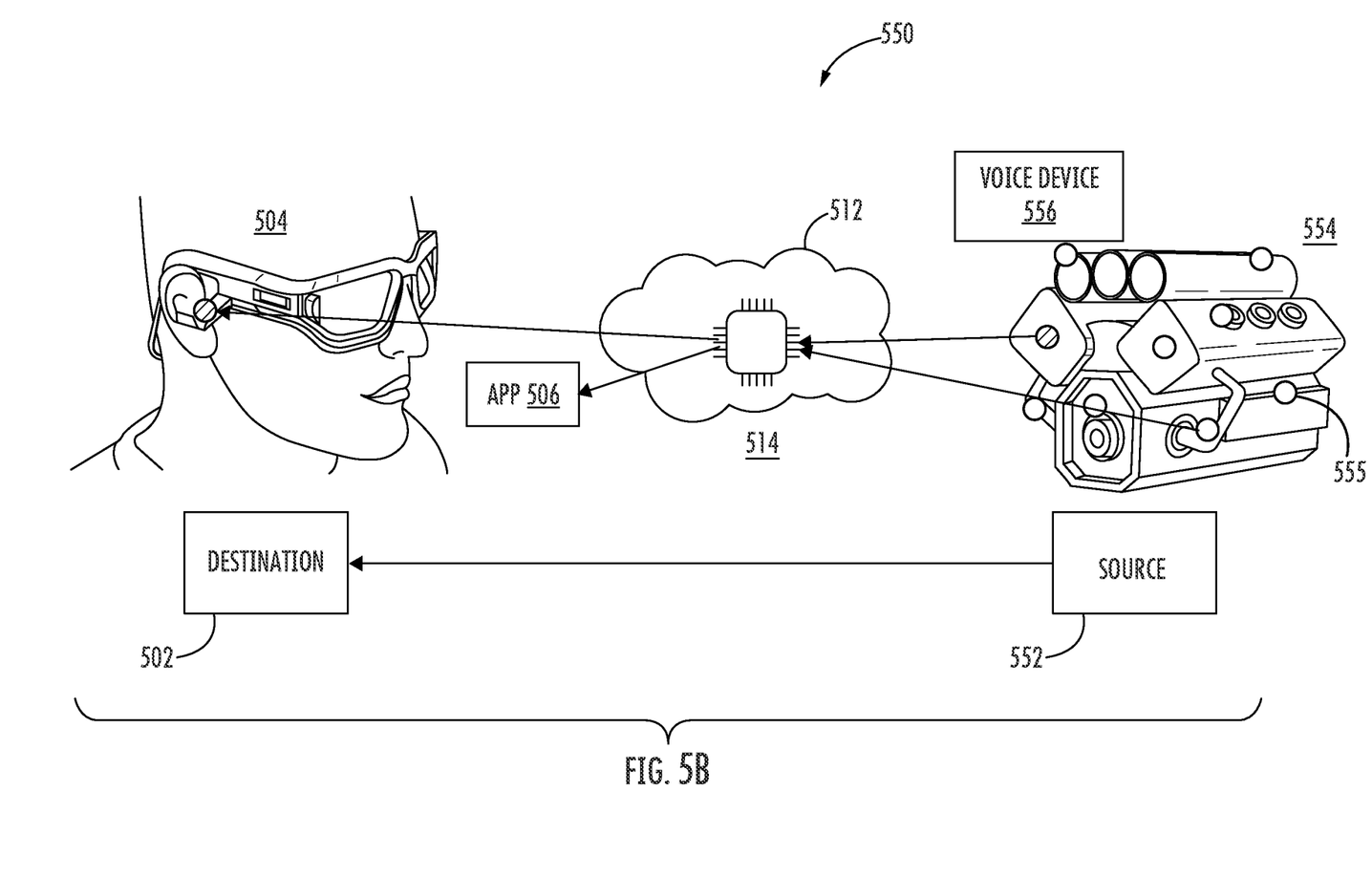

FIG. 5B shows a non-limiting exemplary system, in which items with the same reference number have the same or similar function as in FIG. 5A.

In a system 550, a plurality of sensors 555 are attached to an object 554 or to separately moving parts of an object, such that the motion that is detected is of an object or parts thereof, rather than a person.

Sensors 555 and object 554 form transmitter 552 for transmitting movement information to receiver 502. The movement information is displayed as previously described, except that it relates to movements by object 554.

Optionally an audio device 556 is provided, for example to indicate noise made by the object or to give verbal information from an instructor (not shown).

Figure 6:
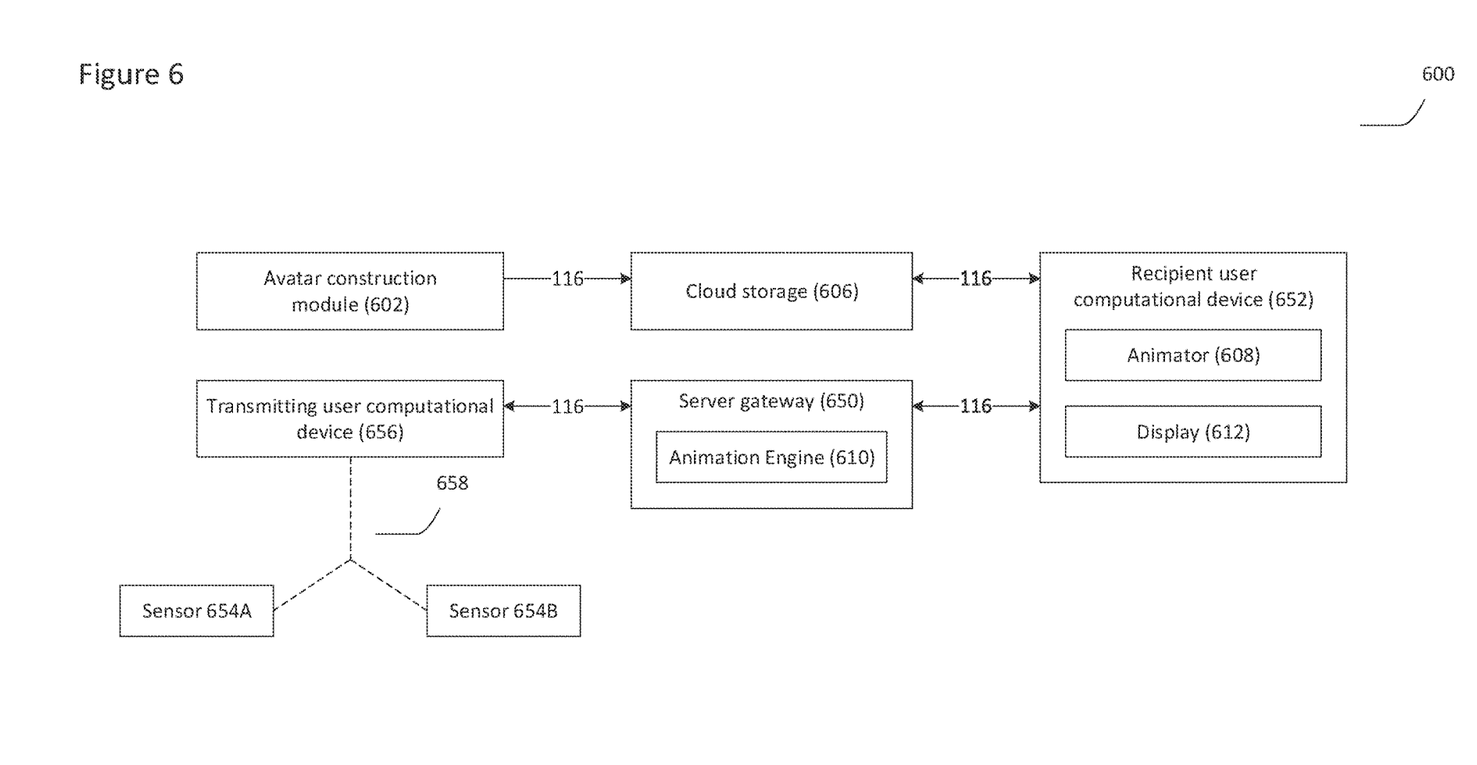
FIG. 6 shows a non-limiting exemplary system, which combines a plurality of optional components in a way which enables an avatar to be animated.

FIG. 6 shows a non-limiting exemplary system, which combines a plurality of optional components in a way which enables an avatar to be animated, in a system 600.

An avatar construction module 602 may be used to provide the initial information for example, to create an avatar or to modify an existing avatar. Avatar construction module 602 may also perform rigging.

A non-limiting example of a computer program which may be used is the Fuse program (Adobe Inc). Fuse is a 3D computer graphics software that enables users to create 3D characters. This software provides the ability to import and integrate user generated content into a character creator function, so that an avatar may be created. Another non-limiting example of a suitable software program is Autodesk (Autodesk, Inc). Avatar construction module 602 also includes animation, to create rigging to animate the avatar. A non-limiting example of a computer program which may be used is the Mixamo program (Adobe Inc). Mixamo's technologies use machine learning methods to automate the steps of the character animation process, including 3D modelling, and also rigging and 3D animation.

Optionally the avatar and the instructions required for its underlying animation are placed into cloud storage module 606. Preferably any other associated information, whether for graphics, execution of the instructions, models and so forth, are also stored at cloud storage module 606. Collectively the stored items form the static aspect of the avatar.

Cloud storage module 606 enables the avatar and the instructions necessary for animation to be stored, so that an animated avatar may be displayed according to implementation of the stored information. Preferably static components are sent once, or as few times as possible, to the recipient device to support efficient use of the binary transmission protocol.

A non-limiting example of a computer program which may be used is the Creative Cloud program (Adobe Inc).

The final animated avatar is preferably created through a combination of an animation engine 610 and an animator 608, for example as operated by a server gateway 650. The dynamic animation streams are processed, preferably in real time, in animation engine 610. Animator 608 preferably processed the stored static components of the avatar. The static and the dynamic components are then preferably merged through the combined actions of animation engine 610 and animator 608.

The animation may then be displayed through a display 612, which may for example be part of a recipient user computational device 652, such as a smartphone for example.

Animation engine 610 may be implemented as described herein.

A non-limiting example of a computer program which may be used for animator 608 is the Aero program (Adobe Inc).

Animations from animation engine 610 are input to animator 608, such as for example Aero, for animating the motion of the limbs and body of the user which would then be applied to the avatar.

Motion sensors 654A and 654B preferably transmit their information to a transmitting user computational device 656, for example as described herein, which then transmits the information to server gateway 650, through a connection 658, which is preferably wireless.

It is appreciated that certain features of the invention, which are, for clarity, described in the context of separate embodiments, may also be provided in combination in a single embodiment.

Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art.

Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference.

In addition, citation or identification of any reference in this application shall not be construed as an admission that such reference is available as prior art to the present invention.

What is claimed is:

1. A system for transmitting animations, the system comprising a transmitting user computational device, a recipient user computational device, a server gateway and computer network, wherein said transmitting user computational device, said recipient user computational device and said server gateway communicate through said computer network; the system further comprising a plurality of movement sensors for being attached to a moving entity and wherein said sensors transmit sensor data regarding movements of said moving entity through said transmitting user computational device to said server gateway; said server gateway comprising an animation engine for analyzing said sensor data to determine a plurality of movements of said moving entity as animation instructions; said recipient user computational device receiving said animation instructions and animating an avatar according to said animation instructions.

2. The system of claim 1, wherein said sensors are adapted to be attached to a plurality of moving components of a moving object.

3. The system of claim 1, wherein said recipient user computational device comprises one or more of a smartphone, a smart watch, smart glasses, a headset with a visual display, a laptop or a desktop computer.

4. The system of claim 1, wherein said sensors comprise a sensor selected from the group consisting of a motion sensor, an audio sensor and a combination thereof.

5. The system of claim 4, wherein said motion sensor comprises a sensor selected from the group consisting of an IMU (Inertial Measurement Unit), an accelerometer, a gyroscope, a compass, a magnetometer, and a combination thereof.

6. The system of claim 1, wherein said movement data is obtained only from sensors attached to said moving entity.

7. The system of claim 6, wherein said sensors are adapted to be attached to a plurality of body parts selected from the group consisting of a plurality of limbs, a torso, a head and a combination thereof, for detecting movement of said plurality of body parts.

8. The system of claim 7, wherein said sensors are only adapted to be attached to said plurality of limbs of said person, or a combination of said plurality of limbs and at least one other body part of said person.

9. The system of claim 8, adapted for two-way communication, wherein sensors are adapted to be attached to a second moving entity for measuring movements of said moving entity, and wherein said recipient computational device transmits sensor data from said sensors adapted to be attached to said second moving entity to said server gateway; wherein said server gateway transmits corresponding animation instructions to said transmitting computational device.

10. The system of claim 9, wherein said sensors attached to said second moving entity are adapted to be attached to a plurality of different limbs, or a combination of said plurality of limbs and at least one other body part, of said second moving entity and wherein said sensors transmit sensor data regarding movements of said recipient user to said server gateway.

11. The system of claim 1, wherein the movement data is not obtained from an optical sensor, depth camera, image camera or structured light camera.

12. The system of claim 1, wherein said recipient computational device comprises a display and wherein said avatar animation is displayed on said display.

13. The system of claim 12, wherein said display further comprises an audio display, and wherein audio data from said moving entity is displayed on said display.

14. The system of claim 13, wherein said audio display comprises voice data.

15. The system of claim 1, wherein sensor data transferred from said sensors to said server are transferred according to a compact binary protocol.

16. The system of claim 15, wherein said compact binary protocol reduces latency to at most 1 second.

17. The system of claim 16, wherein said compact binary protocol reduces latency to at most 1 ms.

18. The system of claim 1, wherein said receiving computational device comprises an immersive telecommunications hardware device for displaying said animations.

19. The system of claim 18, wherein said immersive telecommunications hardware device comprises one or more of a device for supporting virtual reality, augmented reality, mixed reality, immersive verbal and nonverbal telecommunication technologies as well as verbal and nonverbal telecommunication in the reality-virtuality continuum.

20. A method for transmitting animations, the method operating with the system of claim 1, the method comprising receiving sensor data corresponding to a plurality of movements of said moving entity by said animation engine of said server; analyzing said sensor data to determine said plurality of movements by said animation engine; transmitting animation instructions corresponding to said plurality of movements and avatar instructions to said recipient computational device; and displaying an animated avatar by said recipient computational device, according to said animation instructions and said avatar instructions.

21. A method for facilitating non-verbal communication through a plurality of user computational devices and a plurality of motion sensors attached to a plurality of limbs, or a combination of said plurality of limbs and at least one other body part, of each user associated with said plurality of user computational devices, comprising transmitting user movements from said plurality of motion sensors through a first user computational device to a server, and creating animations of said user movements at a second user computational device from rendering information received from said server.

22. The method of claim 21, further comprising transferring voice data from said first user computational device to said second user computational device through said server, wherein said voice data is synchronized according to said animations.

23. A system for transmitting animations to a recipient user, the system comprising a plurality of movement sensors, a recipient user computational device, a server gateway and computer network, wherein said movement sensors, said recipient user computational device and said server gateway communicate through said computer network; wherein said plurality of movement sensors are adapted to be attached to a moving entity, and wherein said sensors transmit sensor data regarding movements of said moving entity to said server gateway.

* * * * *